US00RE34909E

United States Patent [19]

Kindel et al.

[11] E Patent Number: Re. 34,909

[45] Reissued Date of Patent: Apr. 18, 1995

[54] WHEEL FOR A TRACK LAYING VEHICLE

[75] Inventors: Leslie M. Kindel, Holt, Mich.; Iqbal S. Rai, Akron, Ohio

[73] Assignee: Motor Wheel Corporation, Lansing, Mich.

[21] Appl. No.: 807,347

[22] Filed: Dec. 16, 1991

Related U.S. Patent Documents

Reissue of:

[64] Patent No.: 4,950,030
Issued: Aug. 21, 1990
Appl. No.: 407,274
Filed: Sep. 14, 1989

U.S. Applications:

[63] Continuation of Ser. No. 869,388, May 30, 1986, abandoned.

[51] Int. Cl.[6] ..... B62D 55/00

[52] U.S. Cl. ..... 305/24; 305/56; 152/12

[58] Field of Search ..... 305/23, 24, 28, 21, 305/56, 57; 301/95; 152/1, 11, 12, 323

[56] References Cited

U.S. PATENT DOCUMENTS

| | | | |
|---|---|---|---|
| 2,984,524 | 5/1961 | Franzen | 305/56 |
| 3,013,843 | 12/1961 | Sinko | 305/56 X |
| 3,263,315 | 8/1966 | O'Brien | 305/24 X |
| 3,997,217 | 12/1976 | Bandet et al. | 305/21 X |
| 4,449,756 | 5/1984 | Weeks | 305/11 X |
| 4,739,810 | 4/1988 | Markow | 152/12 X |
| 4,784,201 | 11/1988 | Palinkas et al. | 152/323 |

FOREIGN PATENT DOCUMENTS

| | | | |
|---|---|---|---|
| 0199911 | 11/1986 | European Pat. Off. | 305/56 |
| 6143 | 1/1906 | France | 152/12 |
| 364323 | 1/1906 | France | 152/12 |
| 367529 | 1/1906 | France | 152/12 |
| 2564040 | 11/1985 | France . | |

*Primary Examiner*—Russell D. Stormer
*Attorney, Agent, or Firm*—Barnes, Kisselle, Raisch, Choate, Whittemore & Hulbert

[57] ABSTRACT

A road wheel for a track laying vehicle comprising a metallic disc and rim part wherein the rim portion of the part is of toroidal geometry. An elastomeric tire [tread] *part* is bonded to the outer surface of the rim part and has a *tread with a* cylindrical outer face adapted for engagement with the track treads of the track laying vehicle. The cross sectional thickness of the metallic disc and rim part is substantially uniform throughout the same. The rim portion has a radially in-turned flange at the free end thereof extending at an acute angle to the axis of the road wheel. The disc portion merges with the rim portion integrally through a bend portion and extends radially inwardly a given distance to provide a track lug wear surface. The disc portion also has a reverse bend offset axially toward the outer free edge of the rim portion to provide clearance for track guide lugs in the operation of said wheel. The rim portion has a radius of curvature taken in radial cross section in a plane including the wheel axis generally equal to the radius of the disc-rim wheel part measured in a plane at right angles to the wheel axis from the wheel axis to the other curved surface of the rim part. The tire [tread] has axially opposite sloping side walls inclined in a radially inward divergent relationship to one another. A method of making the road wheel is also disclosed.

36 Claims, 2 Drawing Sheets

WHEEL FOR A TRACK LAYING VEHICLE

Matter enclosed in heavy brackets [ ] appears in the original patent but forms no part of this reissue specification; matter printed in italics indicates the additions made by reissue.

This is a continuation Ser. No. 06/869,388, filed on 05/30/86 now abandoned.

The present invention relates to wheels for track laying vehicles and, more particularly, to improvements in road wheels for military tanks and other heavy track laying vehicles.

In track assemblies of crawler-type vehicles a plurality of wheels are provided in a tandem row on each side of the vehicle to contact and run upon the associated track and carry the vehicle weight through the associated suspension systems. One type of known track or bogie wheel assembly comprises a dual wheel set in which two wheels, each having a mounting disc or body and a peripheral rim, are mounted back-to-back onto a hub or spindle, and solid elastomeric [treads] *tires* are secured to the outer faces of the dual rims to ride upon the track shoes or cleats. The mutually facing edges of the dual rims are spaced apart axially of the wheel to provide clearance for the usual upwardly protruding track guides of the track shoes as the wheels roll along the track. In this art, it is common to find special wheel designs which are characteristically custom made, heavy and expensive.

Some typical examples of such prior art tank or track vehicle road wheels are disclosed in U.S. Pat. Nos. 3,263,315 and 3,997,217. Also of interest for their showing of tank idler wheels are U.S. Pat. Nos. 2,789,438 and 3,013,843.

The previous art of tank road wheel design and manufacture typically comprised a substantially flat (cylindrical) rim base to which the rubber tire was bonded. Often the axial edges were curved inwardly to reinforce the edges and as a concession to the economic production of such rims. These flat rims were subject to loads imposed by the tire due to the road forces being absorbed. The flat rim, having a small thickness in the direction of the major resultant of the forces and thus a low section modules or beam strength, was subject to high deformation and stresses.

A further problem in the art arises due to wider rims (axially of the wheel) being used to allow smaller diameter wheels (a function of the carrying capacity of the tires) for greater suspension travel so as to increase mobility over rough terrain. These wider rims accentuate the deflection and thus the required reinforcement for the same. Such reinforcement has been accomplished in a variety of ways, including thicker rim stock, rings attached to the interior of the tire rim, and location of the wheel disc near the high deflection point. All of these methods are aimed at reducing the span between support points to thereby lower overall deflection and stresses. They also add weight and cost.

Another problem in such road wheels for track laying vehicles resides in the high stress levels and stress concentrations in the molded rubber tire affixed to the rim of the wheel. Hysteresis heat generation in the tread rubber due to high loads and speeds contributes to premature rubber and rubber-to-metal bond failures. Also, high compressive and tensile stress concentrations have been found to exist at the bonded edges of such tires.

This is where most failures have been seen to initiate in current road wheel tire designs, such as those used on the M1 U.S. military tank. Thus, despite the use of a relatively thick rubber section in the tire, which adds weight and cost to the wheel, tire life has not been as satisfactory as desired in such heavy duty military track laying vehicle applications.

Accordingly, it is an object of the present invention to provide an improved road wheel for a track laying vehicle which is constructed to have a more even distribution of imposed loadings to hereby reduce deflection stresses of the wheel and tire, thus lowering overall stresses on the part and allowing either greater life or a reduction in stock thickness and weight for the same life with respect to both the wheel and tire.

Another object of the present invention is to provide an improved method of manufacturing the aforementioned novel wheel of the invention.

Other objects, as well as features and advantages of the present invention will become apparent from the following detailed description and when taken in conjunction with the accompanying scale drawings, wherein.

Figure 1:
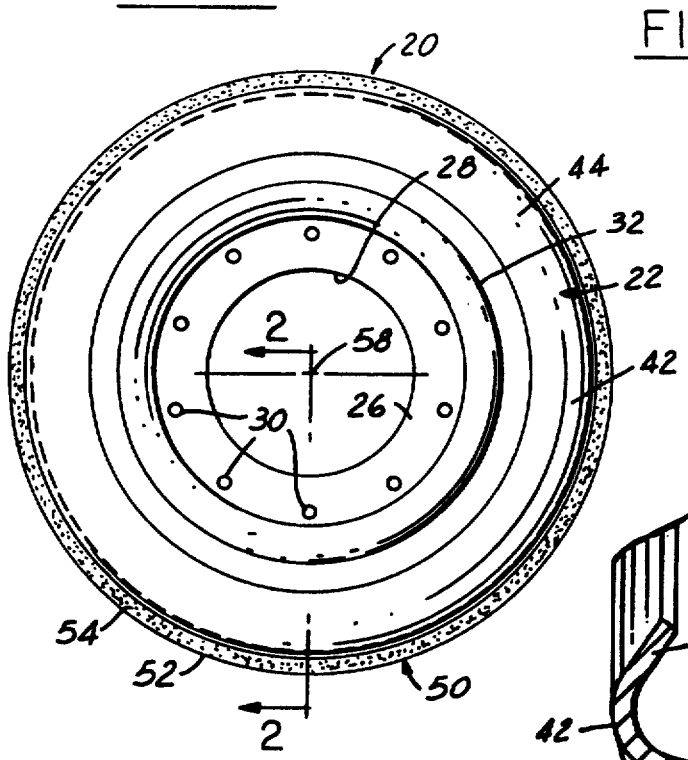
FIG. 1 is a side elevational view of one embodiment of a tank road wheel constructed in accordance with the present invention as viewed from the hub mounting side of the wheel.
Figure 2:
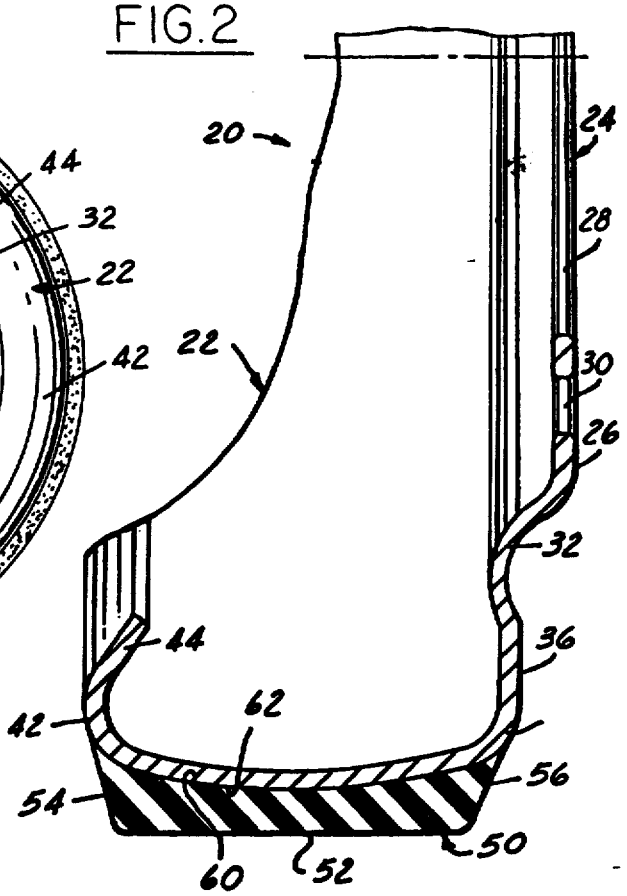
FIG. 2 is a fragmentary cross sectional view taken on the line 2—2 of FIG. 1.

Referring to FIGS. 1 and 2, one embodiment of a tank road wheel 20 constructed in accordance with the present invention comprises as one-piece stamped steel disc and rim part 22 including a disc or "backbone" portion 24 having a hub mounting portion 26 provided with a center opening 28 and a circular row of mounting holes 30 for receiving suitable wheel mounting fasteners therethrough for attachment of the wheel to an associated hub or axle spindle. Disc portion 24 also has a reversely curved portion 32 extending radially outwardly from mounting portion 26 which merges with a radially extending outer peripheral margin portion 36, which in turn is integrally joined through a right angle bend 38 to a rim portion 40. Rim 40 extends generally axially of the wheel away from disc portion 24 and merges through a return bend portion 42 at its outboard edge with an in-turned flange portion 44.

Road wheel 20 also includes a solid rubber tire 50 bonded to the outer peripheral surface of rim 40 to form a circumferentially continuous tire surface for the wheel. Tire 50 has a cylindrical outer periphery which forms a track engaging *tread* surface 52, and laterally opposite sloping side surfaces 54 and 56 which preferably are tapered to diverge radially inwardly relative to the wheel center axis 58 to accommodate the difference between the required narrower width of tread face 52 (axially of the wheel) and the preferred wider axial dimension of rim 40. The inner peripheral surface 60 of tire 50 exactly matches the exterior contour of the outer surface 62 of rim portion 40, a match up which occurs automatically when tire 50 is molded in situ to rim 40. Preferably side surface 54 terminated tangentially with the curvature of return bend 42, whereas inboard tire surface 56 is axially offset in an outboard direction to intersect bend 38 so as to be slightly spaced axially outwardly from the plane of the exterior surface of disc margin 36.

Figure 3:
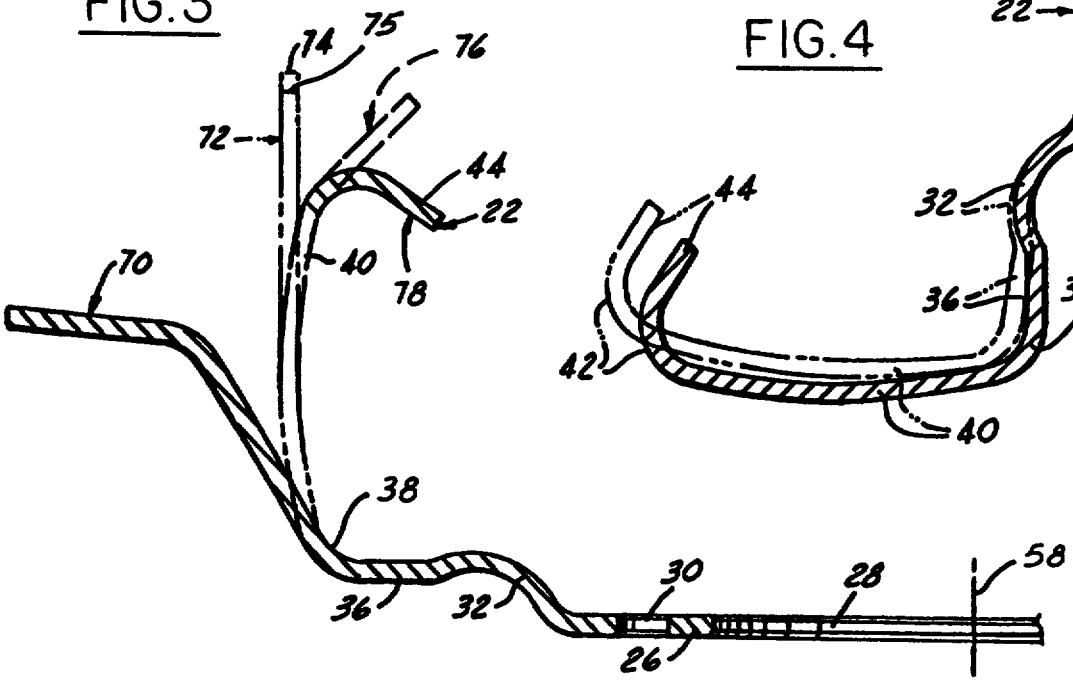
FIG. 3 is a fragmentary composite diagrammatic layout view illustrating certain progressive steps in the formation of the wheel of FIGS. 1 and 2 pursuant to one embodiment of the method of the invention.

The disc-rim part 22 is preferably manufactured in accordance with the procedure indicated diagrammatically in FIG. 3. In the first stage of this method a flat sheet stock of suitable metal, such as SAE 950 HSLA steel modified to meet hardenability requirements and having a minimum thickness of, for example, 0.300", is blanked to form a circular blank of appropriate starting diameter. Preferably sequentially in the same die set an initial draw stamping operation is performed to work the blank into a preform having the contour indicated at 70 in FIG. 3. In the next stage of stamping and ironing operation is performed to reshape preform 70 into the configuration illustrated in phantom at 72 in FIG. 3. In a third operation the upper edge portion 74 of the formed edge flange is machined off or otherwise edge conditioned to provide an edge 75 of uniform height and free of burrs, etc. Next, the upright flange portion is bent inwardly to an angle of approximately 45° with the blank axis 58 to thereby tip the flange inwardly to the position shown at 76 in FIG. 3. The final rim forming opertion curls flange 76 to the position shown at 78 in FIG. 3 so that the resultant flange 44 will have its final inclination (approximately 55° to axis 58) as shown in FIG. 2. Center hole 28 and bolt mounting holes 30, if not already integrated in a previous operation, can then be pierced and/or punched in the disc-rim part 22 while the same is held fixtured by its rim portion 40 to insure concentricity of the center and bolt holes, 28, 30 with the axis of rim portion 40. It is to be understood that the residual stresses in part 22 resulting from the aforementioned drawing and forming operations are intentionally concentrated primarily in the tipped-in flange 44 as well as in the central portion of rim 40, and are beneficial relative to part geometry and design load application inasmuch as they tend to prevent yielding under load. That is, work hardening in the finished disc-rim part resulting from the above-described draw forming and die shaping sequence of steps is sufficient to increase the yield strength of the part material in the areas of highest stress so that the stress levels present will not initiate yielding in the part even under theoretical overloads.

Preferably, the radially extending margin portion 36 is surface hardened to Brinell 287- 461 and to a minimum depth of 0.120", the hardening method as per MIL-STD-12515 or using interrupted quench after induction hardening, with the part to be 400° F. to 500° F. after quench.

In accordance with one principle feature of the present invention, the forming of the disc-rim part 22 is predesigned to produce a rim section 40 having the shape of an arch as viewed in cross section in FIG. 2. This rim arch preferably has a substantially uniform radius of curvature in the plane of the drawing (perpendicular to the radius of curvature of rim section 40 about the axis 58). The arch of the rim 40 spans from the outermost edge 38 of the disc portion 24 to the junction of the rim 40 with the return bend 42. Rim 40 is thus of convex configuration looking in the direction of the applied load in service. It will thus be understood that the geometry of rim 40 provides the strength of the classic arch, which is one of the strongest architectural forms known to man.

In addition, the arch radius of curvature of rim 40 in the aforementioned axial plane may be substantially equal to the radius of curvature of rim 40 about the wheel axis 58. Thus, in three dimensional terms, the curvature of rim portion 40 forms a section of a sphere and is thus spheroidal, another elemental structure of great strength. Design and structural analysis may require different radii of the arch of the rim 40 versus the outside radius about the wheel axis 58, resulting in a substantially toroidal surface. Nevertheless, if consistent with other design specifications and limitations for a given vehicle, such as overall wheel width and wheel diameter, equal radii of rim curvature and wheel are preferred, i.e., a truly spherical rim geometry. Thus, as used herein "toroidal" may be defined as spherical plus or minus the reqeuired deviation in rim arch radius from such equality to meet the vehicle wheel envelope specifications. This toroidal surface may be optimized to minimize stress concentrations due to imposed loadings, thereby causing the entire surface of the toroid to support those loads, thereby distributing stresses and keeping any maximum stress relatively low. Due to this configuration of rim portion 40, in accordance with the present invention, deflection of the rim portion is kept to a minimum, thus lowering overall stresses in the part which in turn results in either greater life, or a reduction in stock thickness and weight for the same life.

Figure 4:
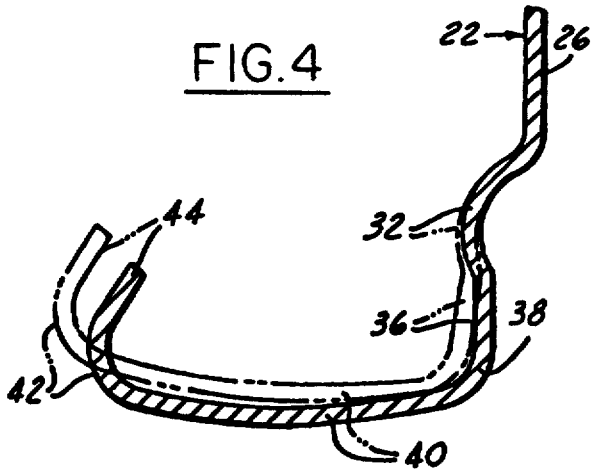
FIG. 4 is a fragmentary view of the wheel of FIGS. 1 and 2 sectioned as in FIG. 2, but without the tire thereon illustrating its mode of deflection under typical load applications.

Referring to FIG. 4, the aforementioned improvement in uniformity of stress distribution can be seen in the manner in which the disc-rim part 22 deflects under normal service loading as the tank road wheel rolls on its track under the weight of the vehicle loading. Compare the solid line position in the unloaded free state of wheel disc-rim part 22 with the phantom line showing of the part which shows typical part deflection at its maximum rated loading. Note that maximum deflection occurs in the displacement of the in-turned outer edge flange 44. Note also that very little change occurs in the curvature of the rim portion 40 between unloaded and maximum deflection positions. It thus will be seen that rim 40, due to its toroidal section, has the strength to carry the loading out to the outer rim edge 44, which, due to its C-shaped channel section, has a strong section modulus relative to the rim portion 40. Relatively even stress distribution thus results so that the strength of the material is utilized with maximum efficiency.

It has also been found that the angle of the in-turned flange 44 relative to axis 58, or alternatively to the radial plane of the wheel perpendicular to this axis, affects the desired optimum stress loading of the part. In the case of the wheel geometry of the embodiment of FIGS. 1–4 (M1 wheel geometry), an angle of approximately 55° relative to the radial plane has been found to be optimal for this effect. In addition, it has been found that the effect of just changing from the prior art "flat" rim to a toroidal rim, without changing from the usual radial flange, is sufficient to reduce the maximum stress by approximately 16% in this embodiment (design). The rubber thickness of tire 50 and the rim toroidal diameters are also parameters which are variables in optimizing the wheel design. Generally speaking, lower stresses can be obtained utilizing larger toroidal diameters.

Another feature of the design shown in FIGS. 1–4 is the "reverse backbone" at portion 32. This reverse backbone is located at the track lug wear surface-disc interface to provide an open wear surface along disc portion 38. Without this reverse curvature, the wheel would be susceptible to being "notched" as the track guide lugs wore against the disc wear surface. Moreover, it has been found that the provision of the reverse backbone in the disc is not detrimental or significant to the resulting desired reduction in the stress levels in the wheel.

Another important feature of the present invention, and presently believed to be a significant contributor to synergistically improved results obtained thereby, resides in the configuration of the molded rubber tire [tread] *part* 50 which is vulcanized to rim section 40. Because of the arched and toroidal configuration of the interface between [tread] *tire* 50 and rim portion 40, the stresses in the molded rubber tire 50 are also significantly reduced, thereby reducing stress crack initiation and retarding growth of the same so as to improve the rubber life of the tire [tread] 50. Basically it has been found that a toroidal supporting surface for the tire [tread], whether it be an arch or toroidal section such as rim portion 40 or some other section geometry providing this contour of outer supporting surface, will cause a reduction in maximum stress in the road wheel rubber due to a more uniform stress distribution of loads in and through the rubber [tread] *tire* 50.

Prior art track laying wheels and associated rubber *tire and* tread designs, such as those used in the M1 tank road wheel tire, have been analyzed and found to indicate high compressive and tensile stress concentrations at the bonded corner where most failures have been seen to initiate. However, with the toroidal supporting surface provided by the rim section 40 of the present invention, much more uniform stress distribution has been obtained, thereby increasing the [tread] *tire* strength-to-weight ratio and allowing greater life for the [tread] *tire* in addition to that of the wheel steel or, due to such greater strength-to-weight ratio, a reduction in thickness of the radial dimension of the tire [tread] 50 with a concomitant reduction in the weight thereof as well as the wheel. For example, by providing a toroidal support for the tire [tread] 50 in accordance with the present invention, stress concentrations at the bonded corners of the tire [tread] are eliminated, tensile stresses on the lateral face of the tire [tread] are decreased, up to 7.3% less rubber is used in the [tread] *tire* , and the [tread] *tire* retains a stiffness within 5% of prior art designs. Because of the elimination of stress concentrations and reduction in tensile stresses, a more durable product is obtained. By following the aforesaid novel [tread] *tire* geometry, it is also believed that the use of a higher than normal modulus rubber compound would further improve performance of the tire [tread] and overall performance of the wheel. In the embodiment of FIGS 1–4, it has been found that the preferred [tread] *tire* geometry may be expressed as a ratio of the minimum thickness of tire [tread] 50 taken radially of wheel 20 to the maximum radial dimension of [tread] *tire* 50 measured from the cylinder defined by the outer face 52 of [tread] *tire* 50 to the junction of the side walls 54 and 56 of [tread] *tire* 50 with the [tim] *rim* portion 38, 40,42 of the disc-rim part 22, this ratio being approximately 1:2.

Figure 5:
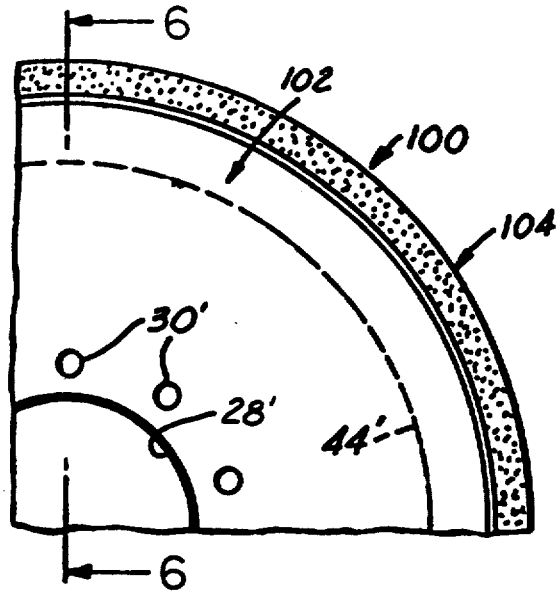
FIG. 5 is a fragmentary side elevational view of another embodiment of a tank road wheel constructed in accordance with the present invention viewed from the hub-mounting side of the wheel.
Figure 6:
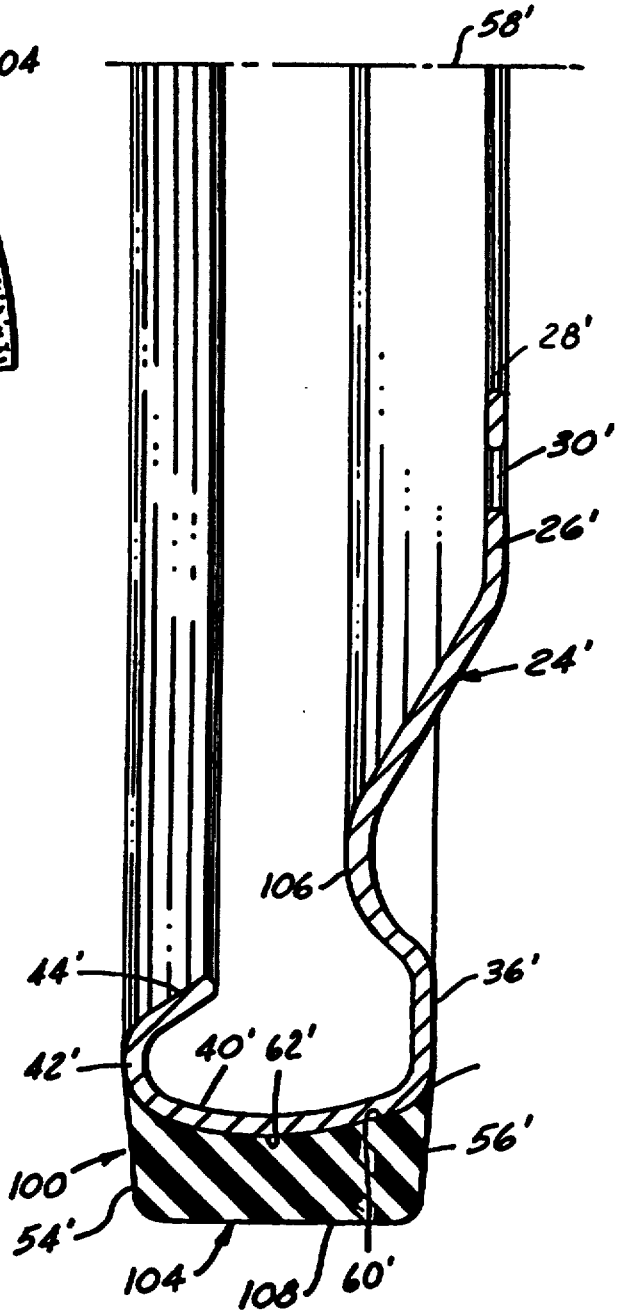
FIG. 6 is a radial cross sectional view taken on the line 6—6 of FIG. 5.
Figure 7:
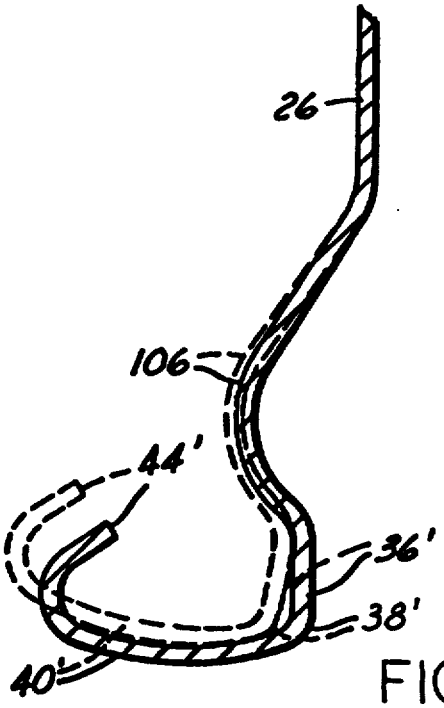
FIG. 7 is a fragmentary view of the wheel of FIGS. 5 and 6, sectioned as in FIG. 6, but without the tire thereon, illustrating its mode of deflection under typical load applications.

FIGS. 5, 6, and 7 illustrate another embodiment of a road wheel 100 for a track laying vehicle constructed in accordance with the present invention, with those elements corresponding to like elements in wheel 20 designated by reference numerals with a prime suffix. Different wheel design specifications have resulted in a variation of the evolution of the wheel geometry of the present invention while adhering to the aforementioned general principles thereof. The wheel 100 of FIGS. 5, 6 and 7 is designed to employ HSLA steel and the dimensional specifications for an armored combat earthmover. It will be seen from viewing these Figures that the toroidal rim concept of the invention is again applied, and weight reduction, which, of course, is desirable, is also obtained. Thus, wheel 100 again consists of a disc-rim part 102 with a molded rubber tire tread 104 having a cross-sectional contour of the present invention and vulcanized to the outer periphery of the rim. Flange 44' has a somewhat smaller inner diameter than that of embodiment 20 due to the different parameters of wheel diameter and loading in this design. As compared to the prior art present wheel configuration used for the aforementioned armored combat earthmover, the embodiment of FIGS. 5 and 6 may be characterized by way of distinction as having a toroidal rim section 40' and the reverse in-turned flange 44' (FIG. 6), preferably having an angle of incidence with the axis 58' of the wheel of 35°. Wheel 100 also has a shallower dish portion 106 than that of the previous prior art design geometry, i.e., a larger radius of curvature and less offset axially relative to the mounting hub portion 26' of the disc-rim part 102.

It has been found that the highest stress location is at the outer flange 44'. The effect of changing the angle of incidence of flange 44' relative to the axis 58' from 0° to the aforementioned 35° is to shift the point of maximum stress from the tip (free edge) of the flange back along the outer side edge of the flange, i.e. toward the return bend portion 42' of the flange. Again, wheel 100 with the disc-rim part 102 may be formed pursuant to the procedure described previously in conjunction with FIG. 3. Likewise, the maximum stress which might be calculated or expected in the wheel embodiment 100 in the steel portion 102 may be mitigated by the residual forming stresses developed in shaping the part 102 according to the method sequence described previously in conjunction with FIG. 3. The resulting work hardening in the part is expected to be sufficient to increase the yield strength so that the stress levels present will not initiate yielding in the material. In addition, weight savings are obtained in this design, mainly from the change in the disc backbone or dish 24'.

Again, it has been found, in accordance with the principle feature of the present invention, that the presence of the toroidal rim 40' is beneficial in that the same strength could not be maintained without it at the same stock thickness. As illustrated in the free state versus loaded conditions in FIG. 7, the presence of the toroidal rim contour prevents the rim section from deflecting inwardly radially under load. Again the toroidal rim 40' of wheel 100 cooperates with the cross-sectional contour of the rubber tire [tread] 104 as shown in FIG. 6 to improve the performance of tire 104 by reducing high shear stresses present at the bonded corners of the [tread] *tire* and by reducing both maximum and minimum principal stresses along the lateral rim surface.

Although tire [tread] 104 of wheel embodiment 100 is relatively thick radially of the wheel as compared with embodiment 20, thinning of this [tread] *tire* section would provide increased tire life, but not necessarily improve the performance of the metal disc-rim part 102.

From the foregoing description it will now be appreciated that the improved road wheel for a track laying vehicle of the present invention provides several advantages over prior commercial and military road wheels. The toroidal support of the tire [treads] significantly reduces the maximum stress concentrations in the rubber tire, and the toroidal shape of the rim section likewise minimizes maximum stress concentrations and improves the strength to weight ratio of the metal part of the wheel. Overall reduction in weight or an improvement in strength to weight ratio is thus obtained by the present invention in a very economical fashion.

Although the present invention is particularly designed and adapted for use with military-type armored or heavy track laying vehicles, it should be understood that the invention may be used with other types of crawler vehicles, such as those utilized in earth moving operations.

In one working example of the present invention constructed in accordance with FIGS. 1 through 4 of the drawings, wheel embodiment 20 is made to the following specifications:

EMBODIMENT SPECIFICATIONS

| Embodiment Specifications | |
|---|---|
| Overall wheel diameter | 25.00" |
| Radius of rim 40 measured to its outer surface apex | 11.81" |
| Radius of curvature of toroidal rim section 40 in the axial plane of the drawing | 11.12" |
| Angle of flange 44 relative to axis 58 of the wheel | 55° |
| Minimum radial thickness of [tread] *tire* 50 | .94" |
| Maximum axial dimension of [tread] *tire* 50 | 6.81" |
| Axial dimension of flat *tread* surface 52 of [tread] *tire* 50 | 5.73" |
| Composition of tread 50 | per MIL-W-3100 or equivalent |

EMBODIMENT SPECIFICATIONS

| Embodiment Specifications | |
|---|---|
| Material specification of disc-rim part 22 | SAE 950 HSLA Mod. |
| Radius of curvature of bend 42 | 1.06" |
| Radius of curvature of bend 38 | 1.06" |
| Radius of curvature of reverse backbone 32 | 1.20" |
| Thickness of steel stock in disc-rim part 22 | .300 min" |

In accordance with another working example of the wheel constructed in accordance with the present invention pursuant to the alternate wheel embodiment 100 of FIGS. 5, 6,and 7, the following specifications were employed:

EMBODIMENT SPECIFICATIONS

| Embodiment Specification | |
|---|---|
| Overall wheel diameter | 28" |
| Radius of rim 40' measured to its outer surface apex | 12.95" |
| Radius of curvature of toroidal rim section 40' in the axial plane of the drawing | 4.35" |

-continued

| Embodiment Specification | |
|---|---|
| Radius of curvature of bend 42' | .735" |
| Angle of flange 44' relative to axis 58 of the wheel | 35° |

EMBODIMENT SPECIFICATIONS

| Embodiment Specifications | |
|---|---|
| Minimum radial thickness of [tread] *tire* 104 | (28"-25.90") |
| Maximum axial dimension of [tread] *tire* 104 | 3.66" |
| Axial dimension of flat *tread* surface 108 of [tread] *tire* 104 | 3.25" |
| Composition of [tread] *tire* 104 | per MIL-W-3100 or equiv |
| Material specification of disc-rim part 102 | SAE 950 HSLA modified |
| Radius of curvature of bend 38' | .59" |
| Radius of curvature of reverse backbone 106 | 1.46" |
| Thickness of steel stock in disc-rim part 102 | .229" min |

It will also be understood that, although the foregoing description and drawings describe and illustrate in detail successful working embodiments of the present invention, to those skilled in the art to which the present invention relates the present disclosure will suggest many modifications in construction as well as widely differing embodiments and applications without hereby departing from the spirit and scope of the invention. The present invention, therefore, is intended to be limited only by the scope of the appended claims and the applicable prior art.

We claim:

1. A support wheel for a vehicle comprising a disc [part] and [a] rim part[, said rim part] having a rim portion of toroidal geometry, said rim portion toroidal geometry being defined by a radially outermost surface of said rim portion having a uniform radius of curvature taken in radial cross section in a plane including the axis of rotation of said wheel and being symmetrical about a radially outermost apex of said toroidal rim portion, said rim portion being joined to and extending generally axially from the radially outermost portion of [said] *a* disc *portion of said* part and having [at least] *only* one free end portion spaced axially of [si] *said* wheel remote from said radially outermost *portion of said* disc portion, and a non-pneumatic elastomeric tire [tread] *part* having a curved inner surface complimentarily matching and being bonded to said outermost surface of [the] *said* rim portion and centered on [ad] *and* also being symmetrical about the apex of said toroidal rim portion, said tire *comprising a* tread having a smooth circumferentially continuous cylindrical *tread* outer face adapted for engagement with a hard, flat supporting surface for the vehicle.

2. A wheel as set forth in claim 1 wherein the cross sectional thickness of said rim portion is substantially uniform throughout the same.

3. A wheel as set forth in claim 2 wherein said rim portion has a radially in-turned flange at said one free end thereof extending convergently toward said disc portion at an acute angle to the axis of the road wheel.

4. A wheel as set forth in claim 3 wherein said radially in-turned flange angle ranges between about 35° to 55°.

5. A wheel as set forth in claim 4 for use as a road wheel with a track laying vehicle having track treads which define the hard flat supporting surface for the vehicle, said tire tread being adapted for engagement with the track laying vehicle track treads, and wherein said disc portion merges with said rim portion integrally through a bend portion and extends radially inwardly a given distance to provide a track lug wear surface, said disc portion having a reverse bend portion merging with said wear surface portion and being offset axially toward the outer free edge of the rim portion to provide clearance for track guide lugs in the operation of said wheel, said reverse bend portion also merging with a wheel hug mounting portion in the central area of said disc [part], said wheel hub mounting portion being offset axially farther from the free end of said rim [port] *portion* than said radially extending disc wear surface portion.

6. A road wheel as set forth in claim 5 wherein said tire [tread] has axially opposite sloping side walls inclined in a radially inward divergent relationship to one another.

7. A road wheel as set forth in claim 6 wherein the one of said tire [tread] side walls closest to the wheel hub mounting *portion of* said disc-rim part terminates at its radially inwardly edge with a slight axially outward offset from the junction of the rim portion with the disc portion of said *disc and rim* part.

8. A road wheel as set forth in claim 6 wherein said side walls slope at an angle to the axis of the wheel ranging from about 3° to 7°.

9. A wheel as set forth in claim 2 wherein said radius of curvature is generally equal to the radius of the disc-rim wheel part measured in a plane at right angles to the wheel axis from the wheel axis to said outer curved surface of said rim portion.

10. The wheel as set forth in claim 2 wherein said tire [tread] has axially opposite side walls extending radially inwardly from said tread outer face to respective junctions with said rim portion outermost surface, and wherein the ratio of the minimum thickness of said tire [tread] radially of the wheel to the maximum radial dimension of said [tread] *tire* measured from said cylindrical outer face of the tread to the junction of the side walls of the [tread] *tire* with the rim portion of the disc-rim part is approximately 1.2.

11. A wheel as set forth in claim 10 wherein the ratio of the uniform radius of curvature of said radially outermost surface of said rim portion of the maximum axial dimension of said tire tread is in the range of about 11.12:6.81 to about 4.35:3.66.

12. A wheel as set forth in claim 4 wherein said wheel is adapted for use as a road wheel on a track laying vehicle having track treads which define the supporting surface for the vehicle, said tire [tread] being adapted for engagement with the track treads of the track laying vehicle and said cylindrical outer face of said tire tread is adapted for engagement with the treads of the track of the track laying vehicle.

13. The wheel as set forth in claim 12 wherein said tire tread has axially opposite side walls extending radially inwardly from said tread outer face to respective junctions with said rim outermost surface, wherein the ratio of the minimum thickness of said tire [tread] radially of the wheel to a maximum radial dimension of said [tread] *tire* measured from said cylindrical outer face of the tread to the junction of the side walls of the [tread wit] *tire with* the rim portion of the disc-rim part is approximately 1:2 and wherein the ratio of the uniform radius of curvature of said radially outermost surface of said rim portion to the maximum axial dimension of said tire [tread] is in the range of about 11.12:6.81 to about 4.35:3.66.

14. The wheel as set forth in claim 13 wherein said radius of curvature is generally equal to the radius of the disc-rim wheel part measured in a plane at right angles to the wheel axis from the wheel axis to said outer curved surface of said rim portion.

15. The wheel as set forth in claim 13 wherein said tire [tread] side walls are inclined in a radially inward divergent relationship to one another.

16. The wheel as set forth in claim 11 wherein said disc and rim parts are formed integrally as one piece from sheet metal, said rim portion extending generally axially in only one direction from the radially outermost portion of said disc part to said one free end portion so as to be cantilevered from said disc part.

17. The wheel as set forth in claim 13 wherein said disc and rim parts are formed integrally as one piece from sheet metal, said rim portion extending generally axially in only one direction from the radially outermost portion of said disc part to said one free end portion so as to be cantilivered from said disc part.

18. The wheel as set forth in claim 15 wherein said disc and rim parts are formed integrally as one piece from sheet metal, said rim portion extending generally axially in only one direction from the radially outermost portion of said disc part to said one free end portion so as to be cantilivered from said disc part.

*19. A one piece metal support wheel for a vehicle comprising a metallic disc and rim part having a vehicle mounting disc portion and a non-pneumatic tire mounting rim portion of toroidal geometry, said rim portion toroidal geometry being defined by a radially outermost convex surface of said rim portion having a generally uniform radius of curvature taken in radial cross section in a plane including the axis of rotation of said wheel, said outermost surface of said rim portion extending generally axially from the radially outermost portion of said disc portion of said disc and rim part to a radially in-turned free end flange portion of said rim portion spaced axially of said wheel remote from said disc portion, said rim portion extending generally axially in only one direction from the radially outermost portion of said disc portion to said free end flange portion so as to be cantilevered from said disc portion, said disc portion merging with said rim portion integrally through a bend portion in said radially outermost portion of said disc portion and extending radially inwardly therefrom to define a bolt circle mounting portion of said disc portion adapted for removable mounting of said wheel via wheel fastener means to a vehicle wheel mounting part, said rim portion outermost surface being disposed radially outwardly of said bend portion and adapted to receive thereon by bonding thereto a non-pneumatic tire having a tread defining an outer peripheral surface adapted for engagement with a supporting surface for the vehicle.*

*20. A wheel as set forth in claim 19 wherein said radially in-turned flange portion extends convergently toward said disc portion at an acute angle to the axis of the road wheel.*

*21. A wheel as set forth in claim 20 wherein said radially in-turned flange portion acute angle ranges between about 35° to about 55°.*

*22. A wheel as set forth in claims 20 and 21 wherein said wheel is formed from sheet metal such that the cross sectional thickness of said rim portion is substantially uniform throughout at least a major portion of the same.*

*23. A wheel as set forth in claim 21 for use with a track laying vehicle having track treads which define a hard flat*

*supporting surface for the vehicle, said wheel further including a tire part having a tread defining an outer peripheral surface adapted for engagement with the track laying vehicle track treads, said tire having an inner surface complimentarily matching and being bonded to said outermost surface of said rim portion.*

*24. A wheel as set forth in claim 23 wherein said disc portion extends radially inwardly a given distance from said bend portion to provide a track lug wear surface, said disc portion having a reverse bend portion merging with said wear surface portion and being offset axially toward the outer free edge of the rim portion to provide clearance for track guide lugs in the operation of said wheel, said reverse bend portion also merging with said wheel mounting portion in the central area of said disc and rim part, said wheel hub mounting portion being offset axially farther from the free end of said rim portion than said radially extending disc wear surface portion.*

*25. A wheel as set forth in claim 23 wherein said tire has axially opposite sloping side walls inclined in a radially inward divergent relationship to one another.*

*26. A wheel as set forth in claim 25 wherein the one of said tire side walls closest to the vehicle wheel mounting part terminates at its radially inwardly edge with a slight axially outward offset from the junction of the rim portion with the disc portion of said disc and rim part.*

*27. A wheel as set forth in claim 25 wherein said side walls slope at an angle to the axis of the wheel ranging from about 3° to 7°.*

*28. A wheel as set forth in claim 23 wherein said outer peripheral surface of said tire tread is cylindrical, and wherein the radio of the minimum thickness of said tire radially of the wheel to the maximum radial dimension of said tire measured from said cylindrical outer tread face to the junction of side walls of the tire with said rim portion of said disc and rim part is approximately 1:2.*

*29. A wheel as set forth in claim 23 wherein the ratio of the uniform radius of curvature of said radially outermost surface of said rim portion to the maximum axial dimension of said tire is in the range of about 11.12:6.81 to about 4.35:3.66.*

*30. A wheel as set forth in claim 19 wherein said radius of curvature is generally equal to the radius of said disc and rim part measured in a plane at right angles to the wheel axis from the wheel axis to said outer curved surface of said rim portion.*

*31. A wheel as set forth in claim 20 further including a non-pneumatic elastomeric tire part having an inner surface complimentary matching and being bonded to said outermost surface of the rim portion and having an outer tread surface adapted for engagement with a supporting surface for the vehicle.*

*32. A wheel as set forth in claim 31 wherein said tire tread outer surface comprises a generally cylindrical outer tread face adapted for engagement with the supporting surface for the vehicle.*

*33. A wheel as set forth in claim 31 wherein said rim portion convex surface is generally symmetrical about an apex of the arch of said toroidal rim portion.*

*34. The wheel as set forth in claim 33 wherein said radially in-turned flange portion acute angle ranges between about 55° to about 35°.*

*35. The wheel as set forth in claim 33 wherein said tire is generally centered on and also generally symmetrical about the apex of said toroidal rim portion.*

*36. The wheel as set forth in claim 35 wherein said wheel is formed from sheet metal such that the cross sectional thickness of said rim portion is substantially uniform throughout at least as major portion of the same.*

* * * * *